United States Patent
Chatterji et al.

(10) Patent No.: US 7,413,014 B2
(45) Date of Patent: *Aug. 19, 2008

(54) FOAMED FLY ASH CEMENT COMPOSITIONS AND METHODS OF CEMENTING

(75) Inventors: Jiten Chatterji, Duncan, OK (US); Roger S. Cromwell, Walters, OK (US); Bobby J. King, Duncan, OK (US); D. Chad Brenneis, Marlow, OK (US); Brent P. Balcer, Magnolia, TX (US); Barry L. Peiser, Katy, TX (US); Don M. Everett, Houston, TX (US)

(73) Assignee: Halliburton Energy Services, Inc., Duncan, OK (US)

( * ) Notice: Subject to any disclaimer, the term of this patent is extended or adjusted under 35 U.S.C. 154(b) by 209 days.

This patent is subject to a terminal disclaimer.

(21) Appl. No.: 10/741,625

(22) Filed: Dec. 19, 2003

(65) Prior Publication Data

US 2005/0133221 A1 Jun. 23, 2005

(51) Int. Cl.
*E21B 33/13* (2006.01)
(52) U.S. Cl. .................. 166/292; 166/293; 106/705; 106/724; 106/726; 106/727; 106/823; 106/DIG. 1
(58) Field of Classification Search ............... 166/292, 166/293; 106/705, DIG. 1, 724, 726, 727, 106/823
See application file for complete search history.

(56) References Cited

U.S. PATENT DOCUMENTS

| | | | | |
|---|---|---|---|---|
| 3,844,351 A | * | 10/1974 | Sutton et al. | 166/293 |
| 3,979,217 A | * | 9/1976 | Sutton | |
| 4,419,135 A | * | 12/1983 | Hoge | 106/678 |
| 4,466,833 A | * | 8/1984 | Spangle | |
| 4,624,711 A | | 11/1986 | Styron | |
| 4,741,782 A | | 5/1988 | Styron | |
| 4,871,395 A | * | 10/1989 | Sugama | |
| 5,183,505 A | | 2/1993 | Spinney | |
| 5,250,578 A | * | 10/1993 | Cornwell | 521/83 |
| 5,383,521 A | | 1/1995 | Onan et al. | 166/293 |
| 5,458,195 A | | 10/1995 | Totten et al. | 166/293 |
| 5,501,277 A | | 3/1996 | Onan et al. | 166/293 |
| 5,565,026 A | * | 10/1996 | Hense et al. | 106/600 |
| 5,569,324 A | | 10/1996 | Totten et al. | 106/696 |
| 5,588,489 A | | 12/1996 | Chatterji et al. | 166/293 |
| 5,711,383 A | | 1/1998 | Terry et al. | 175/72 |
| 5,711,801 A | | 1/1998 | Chatterji et al. | 106/789 |
| 5,806,594 A | * | 9/1998 | Stiles et al. | 166/293 |
| 5,820,670 A | * | 10/1998 | Chatterji et al. | 106/727 |
| 5,875,845 A | | 3/1999 | Chatterji et al. | 166/293 |
| 5,897,699 A | | 4/1999 | Chatterji et al. | 106/678 |
| 6,063,738 A | | 5/2000 | Chatterji et al. | 507/269 |
| 6,138,759 A | | 10/2000 | Chatterji et al. | 166/293 |
| 6,210,476 B1 | * | 4/2001 | Chatterji et al. | 106/677 |
| 6,220,354 B1 | * | 4/2001 | Chatterji et al. | 166/293 |
| 6,315,042 B1 | | 11/2001 | Griffith et al. | 166/291 |
| 6,332,921 B1 | | 12/2001 | Brothers et al. | 106/692 |
| 6,524,384 B2 | | 2/2003 | Griffith et al. | 106/705 |
| 6,586,497 B2 | * | 7/2003 | Gay et al. | 523/130 |
| 6,951,249 B1 | * | 10/2005 | Chatterji et al. | 166/293 |
| 6,953,505 B1 | * | 10/2005 | Chatterji et al. | 106/677 |
| 2002/0050231 A1 | | 5/2002 | Brothers et al. | 106/692 |
| 2003/0116064 A1 | * | 6/2003 | Danican et al. | 106/672 |
| 2004/0112600 A1 | * | 6/2004 | Luke et al. | 166/295 |

FOREIGN PATENT DOCUMENTS

| | | | |
|---|---|---|---|
| EP | 0 611 081 A2 | | 8/1994 |
| EP | 0 779 467 A1 | | 6/1997 |
| EP | 0779467 A1 | * | 6/1997 |
| EP | 1201618 | * | 5/2002 |
| JP | 04349162 | * | 12/1992 |

OTHER PUBLICATIONS

Fly Ash Facts for Highway Engineers, US Dept of Transportation, Federal Hwy Administration, Jul. 1986 "Fly ash as a Resource" p. 6.*
English Translation for Hashimoto et al. "Lining Composition for Tunnels"☐☐Japanese Kokai Application No. Hei 4(1992)-349162 or for JP 04341962 (Dec. 1992).*
Halliburton brochure entitled "Micro Fly Ash Cement Component" dated 1999.
Halliburton brochure entitled "Pozmix® A Cement Additive" dated 1999.

(Continued)

*Primary Examiner*—Paul Marcantoni
(74) *Attorney, Agent, or Firm*—Craig W. Roddy; Baker Botts L.L.P.

(57) ABSTRACT

Methods of cementing and low density foamed cement compositions therefor are disclosed. A low density foamed cement composition of the invention comprises fly ash comprising calcium oxide or calcium hydroxide, water present in an amount sufficient to form a slurry, a foaming and foam stabilizing surfactant or a mixture of surfactants present in an amount sufficient to facilitate foam and stabilize the foamed cement composition, and sufficient gas to foam the foamed cement composition.

44 Claims, No Drawings

OTHER PUBLICATIONS

Halliburton paper entitled "Pozmix Cement & Pozmix 140 for Oil and Gas Well Cementing".

Foreign communication from a related counterpart application dated Mar. 16, 2005.

Love, McCarty, Miller & Semmelbeck, Problem Diagnosis, Treatment Design, and Implementation Process Improves Waterflood Conformance, II SPE 49201, 1998, Society of Petroleum Engineers, Inc., pp. 689-699.

Pappas, Creel & Crook, Identifying Water-Flow Problems, JPT, Aug. 1995, p. 699.

Pappas, Creel & Crook, Problem Identification and Solution Method for Water Flow Problems, SPE 35249, 1996, Society of Petroleum Engineers, Inc., pp. 797-805.

* cited by examiner

FOAMED FLY ASH CEMENT COMPOSITIONS AND METHODS OF CEMENTING

BACKGROUND OF THE INVENTION

1. Field of the Invention

The present invention relates generally to methods of cementing and low density foamed fly ash cement compositions.

2. Description of the Prior Art

In general cementing operations wherein hard substantially impermeable cementitious masses are formed in desired locations, hydraulic cement compositions have heretofore been utilized which contain hydraulic cements such as Portland cements, gypsum cements, silica cements and the like along with water and other additives. In primary well cementing, i.e., the forming of a cement sheath in the annular space between pipe disposed in a well bore and the walls of the well bore, a pumpable hydraulic cement composition is introduced into the annular space and the cement composition is permitted to set therein. The resulting cement sheath provides physical support and positioning to the pipe in the well bore and prevents undesirable fluid migration between subterranean zones and formations penetrated by the well bore.

In some locations, the subterranean zones or formations into or through which wells are drilled have high permeabilities and low compressive and tensile strengths. As a result, the resistances of the zones or formations to shear are low and they have low fracture gradients. When a well fluid such as a hydraulic cement composition is introduced into the well bore penetrating such a subterranean zone or formation, the hydrostatic pressure exerted on the walls of the well bore can exceed the fracture gradient of the zone or formation and cause fractures to be formed in the zone or formation into which the cement composition is lost.

While lightweight cement compositions have been developed and used heretofore, subterranean zones or formations are still encountered which have fracture gradients too low for even the lightweight cement compositions to be utilized without fracturing the formation and the occurrence of loss circulation problems. Also, the lightweight cement compositions utilized heretofore have often not had sufficient compressive, tensile and bond strengths upon setting.

Thus, there are continuing needs for improved low density cement compositions for use in general cementing as well as in cementing in subterranean zones or formations having very low fracture gradients.

SUMMARY OF THE INVENTION

The present invention provides methods of cementing and low density cement compositions which meet the needs described above and overcome the deficiencies of the prior art. The methods of this invention for cementing in subterranean zones which readily fracture at low hydrostatic pressures are comprised of the following steps. A low density foamed cement composition is prepared or provided comprising fly ash comprising calcium oxide or calcium hydroxide, water present in an amount sufficient to form a slurry, a foaming and foam stabilizing surfactant or a mixture of surfactants present in an amount sufficient to facilitate foam and stabilize the foamed cement composition, and sufficient gas to form the cement composition. Thereafter, the cement composition is placed in the zone and allowed to set therein.

The methods of the present invention used in general cementing comprise the following steps. A low density foamed cement composition is placed into a zone to be cemented, the foam cement composition comprising fly ash comprising calcium oxide or calcium hydroxide, water present in an amount sufficient to form a slurry, a foaming and foam stabilizing surfactant or a mixture of surfactants present in an amount sufficient to facilitate foam and stabilize the foam cement composition, and sufficient gas to foam the cement composition. Thereafter, the foam cement composition is allowed to set in the zone.

The low density foamed cement compositions of this invention comprise fly ash comprising calcium oxide or calcium hydroxide, water present in an amount sufficient to form a slurry, a foaming and foam stabilizing surfactant or a mixture of surfactants present in an amount sufficient to facilitate foam and stabilize the foamed cement composition, and sufficient gas to foam the cement composition.

The objects, features and advantages of the present invention will be readily apparent to those skilled in the art upon a reading of the description of preferred embodiments which follows.

DESCRIPTION OF PREFERRED EMBODIMENTS

Improved methods of cementing in subterranean zones which readily fracture at low hydrostatic pressures are provided by the present invention. The methods basically comprise the following steps. A low density foamed cement composition is prepared or provided comprising fly ash mixed with calcium oxide or calcium hydroxide, water present in an amount sufficient to form a slurry, a foaming and foam stabilizing surfactant or a mixture of surfactants present in an amount sufficient to facilitate foam and stabilize the foamed cement composition, and sufficient gas to foam the cement composition. Thereafter, the foamed cement composition is placed in the zone and the foamed cement composition is allowed to set therein.

Because the foamed cement composition of this invention has a low density, i.e., a density such that the hydrostatic pressure of the cement composition exerted in the subterranean zone is less than the fracture gradient of the subterranean zone, fracturing of the zone does not take place.

Fly ash is the finely divided residue that results from the combustion of ground or powdered coal and it is carried by the flue gases generated. Fly ash is a mixture of alumina, silica, unburned carbon and various metallic oxides. While various forms of fly ash can be utilized, mixed with calcium oxide or calcium hydroxide, ASTM Class C or ASTM Class F fly ashes are preferred with ASTM Class F being the most preferred. Class C fly ash generally contains a stoichiometric amount of calcium oxide (lime). In order for the Class F fly ash to function as a cement, a stoichiometric amount of calcium oxide or calcium hydroxide is mixed with the Class F fly ash. That is, when Class F fly ash is mixed with calcium oxide, the mixture comprises 90% (74 lb/sk) Class F fly ash and 10% (8.32 lb/sk) calcium oxide by weight of the mixture. When the Class F fly ash is mixed with calcium hydroxide, the mixture comprises 87% (74 lb/sk) Class F fly ash and 13% (11 lb/sk) calcium hydroxide by weight of the mixture. The Class C fly ash containing calcium oxide or the Class F fly ash mixed with calcium oxide or calcium hydroxide are generally present in the low density foamed cement composition of this invention in an amount of about 87% by weight of the cement composition. The calcium oxide or calcium hydroxide can be naturally present or can be mixed with the fly ash and are generally present in an amount in the range of from about 10% to about 25% by weight of the cement composition. In an exemplary embodiment, the fly ash comprises calcium oxide or calcium hydroxide in an amount in the range of from about 12% to about 18% by weight of the cement composition. In another embodiment, the fly ash comprises calcium oxide or calcium hydroxide in an amount of about 15% by weight of the cement composition.

The water in the foamed cement composition can be fresh water or salt water and the water is mixed with the fly ash and calcium oxide or calcium hydroxide in an amount sufficient to form a slurry, i.e., the water is present in an amount in the range of from about 39% to about 68% by weight of the fly ash present in the composition.

While various foaming and foam stabilizing surfactants can be utilized in accordance with this invention, a particularly suitable such surfactant comprises a mixture of an ethoxylated alcohol ether sulfate present in the mixture in an amount of about 63.3 parts by weight, cocoylamidopropylbetaine present in the mixture in an amount of about 31.7 parts by weight and cocoylamidopropyldimethylamine oxide present in the mixture in an amount of about 5 parts by weight. This surfactant mixture is described in detail in U.S. Pat. No. 6,063,738 issued to Chatterji et al. on May 16, 2000, which is incorporated herein by reference thereto. The surfactant mixture is commercially available from Halliburton Energy Services, Inc. of Duncan, Okla., under the trade designation "ZONESEALANT 2000™."

The foaming and foam stabilizing surfactant utilized is generally present in the cement composition in an amount in the range of from about 0.8% to about 5% by volume of water in the composition, preferably in an amount of about 2%.

Other foaming and foam stabilizing surfactants are available and can be utilized in accordance with the present invention. Mixtures of other suitable surfactants are described in U.S. Pat. Nos. 6,210,476; 5,897,699; 5,875,845; 5,820,670; 5,711,801; and 5,588,489; the relevant disclosures of which are incorporated herein by reference. For example, suitable foaming surfactant are commercially available from Halliburton Energy Services of Duncan, Okla., under the trade designations CFA-S™, HALLIBURTON FOAM ADDITIVE™, AQF-1™, AQF-2™, and HOWCO-SUD™. Suitable foam stabilizing agents are commercially available from Halliburton Energy Services under the trade designations HALLIBURTON FOAM STABILIZE™ and HC-2™.

The gas utilized to foam the cement composition can be air or nitrogen with nitrogen being preferred. The gas is generally present in the foamed cement composition in an amount sufficient to foam the cement composition, i.e., in an amount in the range of from about 20% to about 80% by volume of the fly ash, lime or hydrated lime and water slurry formed.

A preferred method of general cementing utilizing a foamed cement composition of this invention is as follows. A low density foamed cement composition is placed into a zone to be cemented. The foamed cement composition comprises fly ash mixed with calcium oxide or calcium hydroxide, water present in an amount sufficient to form a slurry, a foaming and foam stabilizing surfactant or a mixture of surfactants present in an amount sufficient to facilitate foam and stabilize the foamed cement composition, and sufficient gas to foam the foamed cement composition. After being placed, the foamed cement composition is allowed to set in the zone.

A preferred method of this invention for cementing in a subterranean zone which fractures at low hydrostatic pressures comprises the steps of: (a) preparing or providing a low density foamed cement composition comprising fly ash mixed with calcium oxide or calcium hydroxide, water present in an amount sufficient to form a slurry, a foaming and foam stabilizing surfactant or a mixture of surfactants present in an amount sufficient to facilitate foam and stabilize the foamed cement composition, and sufficient gas to foam the cement composition; (b) placing the foamed cement composition in the zone; and (c) allowing the foamed cement composition to set therein.

A preferred method of general cementing on the surface or otherwise comprises: (a) placing a low density foamed cement composition into a zone to be cemented, the foamed cement composition comprising fly ash mixed with calcium oxide or calcium hydroxide, water present in an amount sufficient to form a slurry, a foaming and foam stabilizing surfactant or a mixture of surfactants present in an amount sufficient to facilitate foam and stabilize the foamed cement composition, and sufficient gas to foam the cement composition; and (b) allowing the foamed cement composition to set in the zone.

A low density foamed cement composition of this invention comprises: fly ash mixed with calcium oxide or calcium hydroxide; water present in an amount sufficient to form a slurry; a foaming and foam stabilizing surfactant or a mixture of surfactants present in an amount sufficient to facilitate foam and stabilize the foamed cement composition; and sufficient gas to foam the foamed cement composition.

As it will be understood by those skilled in the art, the foamed cement compositions of this invention can include various additives to bring about desired results such as accelerators, set retarders, fluid loss additives, and the like.

In order to further illustrate the methods and low density foamed cement compositions of this invention, the following examples are given.

EXAMPLE 1

A cement slurry having a density of 13.64 pounds per gallon was prepared by mixing 57.3% (74/lb/sk) Class F fly ash, 8.5% (11 lb/sk) hydrated lime and 34.2% (5.3 gal/sk) water by weight of the cement slurry. A portion of the slurry was cured at 140° F. for 24 hours after which the cured cement was tested for compressive strength, tensile strength and shear bond. Anhydrous calcium chloride was added to two additional portions of the slurry in amounts of 2% by weight and 4% by weight, respectively. Those two slurries were also cured at 140° F. for 24 hours and had thickening times of 2 hours and 30 minutes and 2 hours and 24 minutes respectively. The results of these tests are set forth in Table I below.

TABLE I 74 lb/sk Class F Fly Ash + 11 lb/sk Hydrated Lime @ 13.64 lb/gal
(Cured at 140° F. for 24 hours)

| CaCl$_2$ (%) | Water (gal/sk) | Compressive Strength (psi) | Tensile Strength (psi) | Shear Bond (psi) | Thickening Time (hr:min) |
|---|---|---|---|---|---|
| 0 | 5.3 | 1200 | 108 | 122 | 4:00+ |
| 2 | 5.35 | 1660 | 110 | 118 | 2:30 |
| 4 | 5.39 | 2295 | 114 | 125 | 2:24 |

From Table I, it can be seen that the three cured slurries exhibited similar properties.

EXAMPLE 2

An additional portion of the cement slurry of Example 1 having a density of 13.64 pounds per gallon was mixed with a foaming and foam stabilizing surfactant mixture in an amount of 1.5% by volume of water (b.v.o.w.). Portions of the slurry were foamed with air at ambient temperature and pressure to foamed densities of 10, 11 and 12 pounds per gallon. The resulting foamed slurries were cured at 140° F. for 24 hours and then tested for compressive strength, tensile strength and shear bond. The thickening time of one of the foamed cement slurries was also determined. The results of these tests are shown in Table II.

TABLE II 74 lb/sk Class F Fly Ash + 11 lb/sk Hydrated
Lime + 1.5% "ZONESEALANT 2000 ™"
(b.v.o.w.) + 5.3 gal/sk
Water @13.64 lb/gal
(Cured at 140° F. for 24 hours)

| Foamed Density (lb/gal) | Compressive Strength (psi) | Tensile Strength (psi) | Shear Bond (psi) | Thickening Time (hr:min) |
|---|---|---|---|---|
| 10 | 354 | 52.4 | 79.2 | 4-6:00+ |
| 11 | 437 | 57.2 | 113.6 | |
| 12 | 547 | 93.5 | 111.8 | |

From Table II, it can be seen that the cured foamed slurries had similar compressive strengths, tensile strengths and shear bond.

EXAMPLE 3

The tests described above in Example 2 were repeated except that the slurries each included 2% calcium chloride. The results of these tests are shown in Table III below.

TABLE III 74 lb/sk Class F Fly Ash + 11 lb/sk Hydrated
Lime + 2.0% $CaCl_2$ by Wt. of Fly Ash + 1.5%
"ZONESEALANT2000 ™" (b.v.o.w.) + 5.35
gal/sk Water @ 13.64 lb/gal
(Cured at 140° F. for 24 hours)

| Foamed Density (lb/gal) | Compressive Strength (psi) | Tensile Strength (psi) | Shear Bond (psi) | Thickening Time (hr:min) |
|---|---|---|---|---|
| 10 | 626 | 94.9 | 175.6 | 2.5-4:00+ |
| 11 | 659 | 104.6 | 177.5 | |
| 12 | 956 | 111.6 | 203 | |

From Table III, it can be seen that the presence of anhydrous calcium chloride brought about an increase in compressive strength, tensile strength and shear bond.

EXAMPLE 4

The tests described in Example 3 were repeated except that 4.0% anhydrous calcium chloride by weight of fly ash and hydrated lime was included in each test cement slurry. The results of these tests are shown in Table IV below.

TABLE IV 74 lb/sk Class F Fly Ash + 11 lb/sk Hydrated
Lime + 4.0% $CaCl_2$ by Wt. of Fly
Ash + 1.5% "ZONESEALANT2000 ™"
(b.v.o.w.) + 5.35 gal/sk Water @ 13.64 lb/gal
(Cured at 140° F. for 24 hours)

| Foamed Density (lb/gal) | Compressive Strength (psi) | Tensile Strength (psi) | Shear Bond (psi) | Thickening Time (hr:min) |
|---|---|---|---|---|
| 10 | 442 | 33.6 | 60.3 | 2-4:00+ |
| 11 | 526 | 71.5 | 84.5 | |
| 12 | 696 | 103.8 | 104 | |

From Table IV, it can be seen that the compressive strength, tensile strength and shear bond were less than those obtained in Example 3.

EXAMPLE 5

A cement slurry containing the same components and amount as those prepared in Example 3 was foamed to 11 pounds per gallon at 175° F. and 1,000 psi pressure. The foamed slurry was cured at 200° F. for 48 hours and then was tested for compressive strength. The results of the tests set forth in Table V show the compressive strengths of the cured foamed slurry and that the variation in cured slurry density was no more than plus or minus one pound per gallon. The foam was generated under temperature and pressure using the multiple analysis cement slurry analyzer (MACS), a complete description of which is given in U.S. Pat. No. 6,227,294 incorporated herein by reference thereto.

TABLE V 74 lb/sk Class F Fly Ash + 11 lb/sk Hydrated
Lime + 2.0% $CaCl_2$ by Wt. of Fly Ash + 1.5%
"ZONESEALANT 2000 ™" (b.v.o.w.) + 5.35
gal/sk Water @13.64 lb/gal:
Foamed to 11.0 lb/gal and Cured at 200° F.

| Sample # | Transfer Density (lb/gal) | 48 Hour Compressive Strength (psi) | Stability (lb/gal) | | |
|---|---|---|---|---|---|
| | | | Top | Middle | Bottom |
| Cell 1 | 11.15 | 672 | 10.21 | 10.06 | 9.88 |
| Cell 2 | 10.98 | 525 | 10.88 | 10.87 | 11.19 |

The results given in Tables I-V show that the foamed fly ash cement slurries have excellent properties for cementing subterranean zones penetrated by a well bores and for general surface cementing.

Thus, the present invention is well adapted to attain the objects and advantages mentioned as well as those which are inherent therein. While numerous changes may be made by those skilled in the art, such changes are encompassed within the spirit of this invention as defined by the appended claims.

What is claimed is:

1. A method of cementing a pipe in a well bore, the method comprising:
   introducing a foamed cement composition into a space between the pipe disposed in the well bore and a wall of the well bore, the foamed cement composition comprising fly ash, water, a foaming and stabilizing surfactant, and a gas, wherein the foamed cement composition is essentially free of additional cementitious components; and allowing the foamed cement composition to set in the space.

2. The method of claim 1 wherein the fly ash is selected from the group consisting of Class C fly ash and Class F fly ash.

3. The method of claim 1 wherein the fly ash comprises Class C fly ash.

4. The method of claim 1 wherein the fly ash comprises lime.

5. The method of claim 4 wherein the lime comprises hydrated lime.

6. The method of claim 1 wherein the water in the foamed cement composition is selected from the group consisting of fresh water and saltwater.

7. The method of claim 1 wherein the water is present in the foamed cement composition in an amount in the range of from about 39% to about 68% by weight of the fly ash in the composition.

8. The method of claim 1 wherein the foaming and stabilizing surfactant comprises a mixture of surfactants.

9. The method of claim 1 wherein the foaming and foam stabilizing surfactant comprises a mixture of an ethoxylated alcohol ether sulfate present in the mixture in an amount of about 63.3 parts by weight, cocoylamidopropylbetaine present in the mixture in an amount of about 31.7 parts by weight and cocoylamidopropyldimethylamine oxide present in the mixture in an amount of about 5 parts by weight.

10. The method of claim 1 wherein the foaming and foam stabilizing surfactant is present in the foamed cement composition in an amount in the range of from about 0.8% to about 5% by volume of the water in the foamed cement composition.

11. The method of claim 1 wherein the gas is selected from the group consisting of air and nitrogen.

12. The method of claim 1 wherein the gas is present in the foamed cement composition in an amount in the range of from about 20% to about 80% by volume of the water and fly ash.

13. The method of claim 1 wherein the foamed cement composition has a density in the range of from about 10 pounds per gallon to about 12 pounds per gallon.

14. A method of primary cementing comprising:
introducing a foamed cement composition into a space between a pipe disposed in a well bore and a wall of the well bore, the foamed cement composition comprising Class C fly ash, water, a foaming and stabilizing surfactant, and a gas, wherein the foamed cement composition is essentially free of additional cementitious components; and
allowing the foamed cement composition to set in the space.

15. The method of claim 14 wherein the water in the foamed cement composition is selected from the group consisting of fresh water and saltwater.

16. The method of claim 14 wherein the water is present in the foamed cement composition in an amount in the range of from about 39% to about 68% by weight of the fly ash in the composition.

17. The method of claim 14 wherein the foaming and stabilizing surfactant comprises a mixture of surfactants.

18. The method of claim 14 wherein the foaming and foam stabilizing surfactant comprises a mixture of an ethoxylated alcohol ether sulfate present in the mixture in an amount of about 63.3 parts by weight, cocoylamidopropylbetaine present in the mixture in an amount of about 31.7 parts by weight and cocoylamidopropyldimethylamine oxide present in the mixture in an amount of about 5 parts by weight.

19. The method of claim 14 wherein the foaming and foam stabilizing surfactant is present in the foamed cement composition in an amount in the range of from about 0.8% to about 5% by volume of the water in the foamed cement composition.

20. The method of claim 14 wherein the gas is selected from the group consisting of air and nitrogen.

21. The method of claim 14 wherein the gas is present in the foamed cement composition in an amount in the range of from about 20% to about 80% by volume of the water and fly ash.

22. The method of claim 14 wherein the foamed cement composition has a density in the range of from about 10 pounds per gallon to about 12 pounds per gallon.

23. A method of cementing a pipe in a well bore, the method comprising:
introducing a foamed cement composition into a space between the pipe disposed in the well bore and a wall of the well bore, the foamed cement composition comprising fly ash, lime, water, a foaming and stabilizing surfactant, and a gas, wherein the foamed cement composition is essentially free of additional cementitious components; and
allowing the foamed cement composition to set in the space.

24. The method of claim 23 wherein the fly ash is selected from the group consisting of Class C fly ash and Class F fly ash.

25. The method of claim 23 wherein the fly ash comprises Class F fly ash.

26. The method of claim 23 wherein the lime comprises hydrated lime.

27. The method of claim 23 wherein the water in the foamed cement composition is selected from the group consisting of fresh water and saltwater.

28. The method of claim 23 wherein the water is present in the foamed cement composition in an amount in the range of from about 39% to about 68% by weight of the fly ash in the composition.

29. The method of claim 23 wherein the foaming and stabilizing surfactant comprises a mixture of surfactants.

30. The method of claim 23 wherein the foaming and foam stabilizing surfactant comprises a mixture of an ethoxylated alcohol ether sulfate present in the mixture in an amount of about 63.3 parts by weight, cocoylamidopropylbetaine present in the mixture in an amount of about 31.7 parts by weight and cocoylamidopropyldimethylamine oxide present in the mixture in an amount of about 5 parts by weight.

31. The method of claim 23 wherein the foaming and foam stabilizing surfactant is present in the foamed cement composition in an amount in the range of from about 0.8% to about 5% by volume of the water in the foamed cement composition.

32. The method of claim 23 wherein the gas is selected from the group consisting of air and nitrogen.

33. The method of claim 23 wherein the gas is present in the foamed cement composition in an amount in the range of from about 20% to about 80% by volume of the water and fly ash.

34. The method of claim 23 wherein the foamed cement composition has a density in the range of from about 10 pounds per gallon to about 12 pounds per gallon.

35. A method of primary cementing comprising:
introducing a foamed cement composition into a space between a pipe disposed in a well bore and a wall of the well bore, the foamed cement composition comprising Class F fly ash, lime, water, a foaming and stabilizing surfactant, and a gas, wherein the foamed cement composition is essentially free of additional cementitious components; and allowing the foamed cement composition to set in the space.

36. The method of claim 35 wherein the water in the foamed cement composition is selected from the group consisting of fresh water and saltwater.

37. The method of claim 35 wherein the water is present in the foamed cement composition in an amount in the range of from about 39% to about 68% by weight of the fly ash in the composition.

38. The method of claim 35 wherein the lime comprises hydrated lime.

39. The method of claim 35 wherein the foaming and stabilizing surfactant comprises a mixture of surfactants.

40. The method of claim 35 wherein the foaming and foam stabilizing surfactant comprises a mixture of an ethoxylated alcohol ether sulfate present in the mixture in an amount of about 63.3 parts by weight, cocoylamidopropylbetaine present in the mixture in an amount of about 31.7 parts by weight and cocoylamidopropyldimethylamine oxide present in the mixture in an amount of about 5 parts by weight.

41. The method of claim 35 wherein the foaming and foam stabilizing surfactant is present in the foamed cement composition in an amount in the range of from about 0.8% to about 5% by volume of the water in the foamed cement composition.

42. The method of claim 35 wherein the gas is selected from the group consisting of air and nitrogen.

43. The method of claim 35 wherein the gas is present in the foamed cement composition in an amount in the range of from about 20% to about 80% by volume of the water and fly ash.

44. The method of claim 35 wherein the foamed cement composition has a density in the range of from about 10 pounds per gallon to about 12 pounds per gallon.

* * * * *